US006690718B1

(12) United States Patent
Kim

(10) Patent No.: US 6,690,718 B1
(45) Date of Patent: Feb. 10, 2004

(54) ASYMMETRIC DIGITAL SUBSCRIBER LINE TRANSCEIVER UNIT-CARD AND METHOD OF CONTROLLING THE SAME

(75) Inventor: Heung-soo Kim, Ansan (KR)

(73) Assignee: Samsung Electronics Co. Ltd., Kyungki-do (KR)

( * ) Notice: Subject to any disclaimer, the term of this patent is extended or adjusted under 35 U.S.C. 154(b) by 0 days.

(21) Appl. No.: 09/448,995

(22) Filed: Nov. 24, 1999

(30) Foreign Application Priority Data

Nov. 26, 1998 (KR) ........................................ 1998-50941

(51) Int. Cl.[7] ................................................ H04B 1/38
(52) U.S. Cl. ........................ 375/222; 375/222; 375/220; 375/480; 379/93.28; 379/93.06; 379/93.07; 379/93.14; 379/93.18; 370/485; 370/419; 370/480; 370/357
(58) Field of Search ................................ 375/220, 222, 375/480; 379/93.28, 93.06, 93.07, 93.14, 93.18; 370/485, 419, 480, 357

(56) References Cited

U.S. PATENT DOCUMENTS 4,371,789 A * 2/1983 Chen et al. .................... 307/38
5,852,655 A * 12/1998 McHale et al. ........... 379/93.14
6,269,154 B1 * 7/2001 Chellali et al. .......... 379/93.28

FOREIGN PATENT DOCUMENTS

JP 5-260535 10/1993

OTHER PUBLICATIONS

Network Migration (Young, Gavin/ Dec. 1997/ ADSL Forum/ Technical Report TR–004/ pp. 1–57 / www.adsl.com).*

Asymmetric Digital Subscriber Line (ADSL) (David C. Lee and Erik Hallnor / Apr. 15, 1997 / EE 4984: Telecommunications Networks / pp. 1–6 / http://fiddle.visc.vt.edu/courses/e4984/Projects1997/Iee–hallnor.html).*

Network Migration (Young, Gavin / Dec. 1997 / ADSL Forum / Technical Report TR–004 / pp. 1–57 / www.adsl.com).*

ADSL Network Element Management (Young, Gavin/Mar. 1998/ADSL Fourum/ Technical Report TR–004/ pp. 1–24/ www.adsl.com).*

* cited by examiner

Primary Examiner—Stephen Chin
Assistant Examiner—Guillermo Muñoz
(74) Attorney, Agent, or Firm—Sughrue Mion, PLLC

(57) ABSTRACT

An asymmetric digital subscriber line transceiver unit-card (ATU-C) and a method of controlling the same. The ATU-C includes: a power supply unit; a plurality of modems to be connected to a plurality of asymmetric digital subscriber line transceiver unit-remote (ATU-R) for subscribers; a plurality of power switches for selectively supplying power generated by the power supply unit to the modems; and a microprocessor for controlling the operation of the power switches depending on the connection status between the subscribers and the modems.

9 Claims, 3 Drawing Sheets

ASYMMETRIC DIGITAL SUBSCRIBER LINE TRANSCEIVER UNIT-CARD AND METHOD OF CONTROLLING THE SAME

BACKGROUND OF THE INVENTION

1. Field of the Invention

The present invention relates to asymmetric data transmission apparatuses, and more particularly, to an asymmetric digital subscriber line transceiver unit-card (ATU-C) in which power is not supplied to a modem that is not connected to a subscriber, and a method of controlling the same.

2. Description of the Related Art

Asymmetric digital subscriber line (ADSL) relates to a new technology for transmission developed by Bellcore (USA). ADSL enables downward transmission of data, for example, from a telephone office to a subscriber, at a rate of 1.5–8 Mbps. Further, ADSL provides for an upward transmission, for example, from the subscriber to the telephone office at a low rate using conventional twisted-pair phone cables. ADSL technology is based on a technique for frequency division multiplexing (FDM). In such an FDM technique, a 1.5 Mbps down-channel is constituted at a frequency band higher than a 4 KHz voice band, and a 16 Kbps up-channel is constituted between the down-channel frequency band and the voice band. Analog voice calls are transmitted over the lowest frequency band.

ADSL utilizes conventional twisted-pair phone cables. This ensures that a transmission distance of sufficient length is provided to allow direct connection between a telephone office or a remote station and a subscriber, without relay. Also, installing a service system for using ADSL is as convenient as installing a conventional plain-old-telephone service (POTS). Further, a frequency band carrying video and control signals is allocated above the frequency band carrying conventional phone signal. Such an allocation ensures that various signals can be transmitted at the same time over a phone line without overlap of frequency bands. ADSL. Likewise, an ATU-Remote (ATU-R), which acts as a transmission unit, is connected to the subscriber end of the ADSL. The ATU-R and a conventional telephone set are directly connected to a personal computer (PC), a synchronous transfer mode (ATM) or local area network (LAN) console, or to a video/audio signal decoder. The video/audio signal decoder is referred to as "set-top box". Such a set-top box is connected to a television (TV) receiver or PC. As mentioned, the ADSL system can be connected to an ATM network.

With the increased use of ADSL modems, an owner of a public network will expand concurrently by building up the ATM backbone of the network. The will further enable subscribers to use ADSL modem.

FIG. 1 is a block diagram showing the structure of an a synchronous data transmission apparatus. In FIG. 1, reference numeral 100 represents a device installed at the telephone office end (hereinafter, referred to as an ADSL device for the telephone office), and reference numerals 28a–28n represent devices installed at the subscriber end (hereinafter, referred to as an ADSL device for subscriber). The ADSL device for the telephone office 100 includes a network interface and control card 10 for interfacing with a data bus on one side and a high-speed data network on the other, a maintenance and repair management unit 12. A plurality of ATU-Cs, 18a through 18n, are connected to the data bus on one side and a plurality of ADSL devices, for use by subscribers, on the other.

A plurality of modems (not shown) for the ADSL are installed in each of the ATU-Cs 18a through 18n. These modems allow connection to the plurality of ADSL devices intended for use by subscribers. Upon supply of power to the ATU-Cs 18a through 18n, power is also simultaneously applied to all the modems. Further, the system monitors whether a subscriber requests connection to a phone line.

However, it is expected that most of the time, not all of the modems associated with the ATU-Cs will be allocated to subscribers. In particular, when a subscriber disconnects, a corresponding modem that becomes unallocated because of the termination of the connection, continues to consume power. Also, in the case of increasing the number of ATU-Cs, the modems corresponding to the new ATU-Cs may remain free for some time before they are allocated to subscribers.

However, because power is simultaneously applied to all the models corresponding to the ATU-Cs, unnecessary power consumption increases in proportion to the number of unallocated modems. Such a waste of power increases the amount of heat generated in the ADSL device for the telephone office, and deteriorates the ATU-C.

SUMMARY OF THE INVENTION

An object of the present invention is to provide an asymmetric digital subscriber line transceiver unit-card (ATU-C) capable of optimizing the use of power by supplying power only to modems that are allocated to a subscriber.

Another object of the present invention is to provide a method of controlling the ATU-C.

According to an aspect of the present invention, there is provided an asymmetric digital subscriber line transceiver unit-card (ATU-C) comprising: a plurality of modems, that can be connected to a plurality of asymmetric digital subscriber line transceiver unit-remote (ATU-R) for subscribers; a plurality of power switches for selectively supplying power to the plurality of modems; and a microprocessor for controlling an operation of the plurality of power switches.

Preferably the ATU-C further comprises a power supply unit, wherein power is supplied to the plurality of modems using the power supply unit.

Preferably the microprocessor controls the operation of the plurality of power switches based on a connection status between subscribers and the plurality of modems.

Preferably the plurality of power supply switches supply power to the plurality of modems in response to signals from the microprocessor.

Preferably the ATU-C further comprises a maintenance and repair management unit for coordinating with the microprocessor in managing maintenance and repair of the ATU-C.

Preferably power supply can be interrupted for each of said plurality of modems for testing.

Still preferably the microprocessor obtains information on the connection status of the plurality of modems and the subscribers by querying the maintenance and repair management unit.

Still preferably a user is provided the ability to cut off and resupply power to each of said plurality of modems through the maintenance and repair management unit for testing.

Another aspect of the present invention is a method of controlling an asymmetric digital subscriber line transceiver unit-card (ATU-C) including a power supply unit; a plurality of modems that can be connected to a plurality of asymmetric digital subscriber line transceiver unit-remote (ATU-R) for subscribers; a plurality of power switches for selectively supplying power generated by the power supply unit to the modems; and a microprocessor for controlling the operation of the power switches depending on the connection status between the subscribers and the modems, the method comprising: initializing the ATU-C after power is supplied to the ATU-C, by initializing the power switches to an off state in which power is not applied to the plurality of modems; and controlling the power switches depending on the connection status between the subscribers and the modems, to supply power only to a subset of the plurality of modems that are allocated to subscribers.

BRIEF DESCRIPTION OF THE DRAWINGS

The above objects and advantages of the present invention will become more apparent by describing in detail preferred embodiments thereof with reference to the attached drawings in which.

DESCRIPTION OF THE PREFERRED EMBODIMENTS

Figure 1:
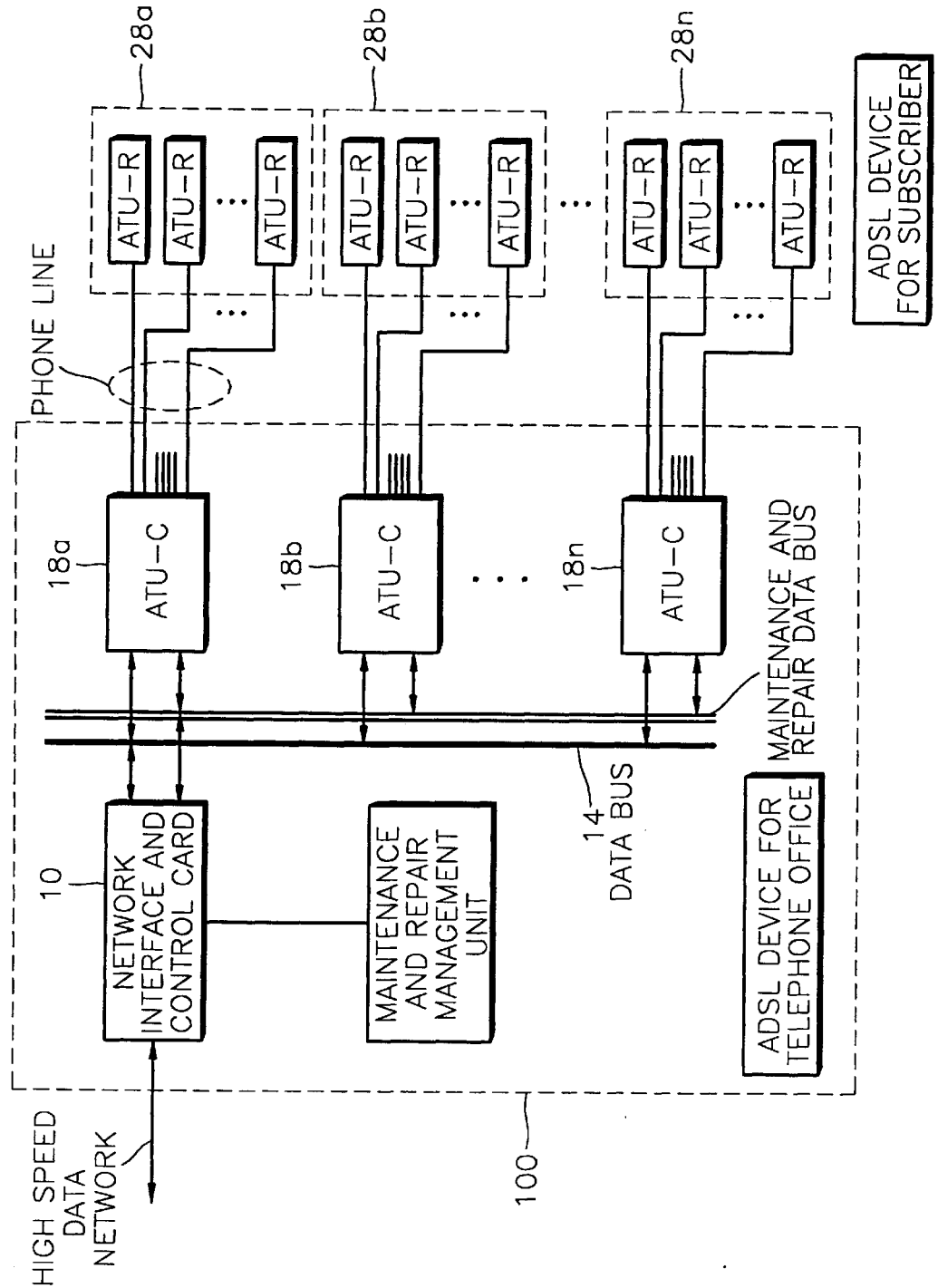
FIG. 1 is a block diagram showing the structure of an asymmetric data transmission apparatus.
Figure 2:
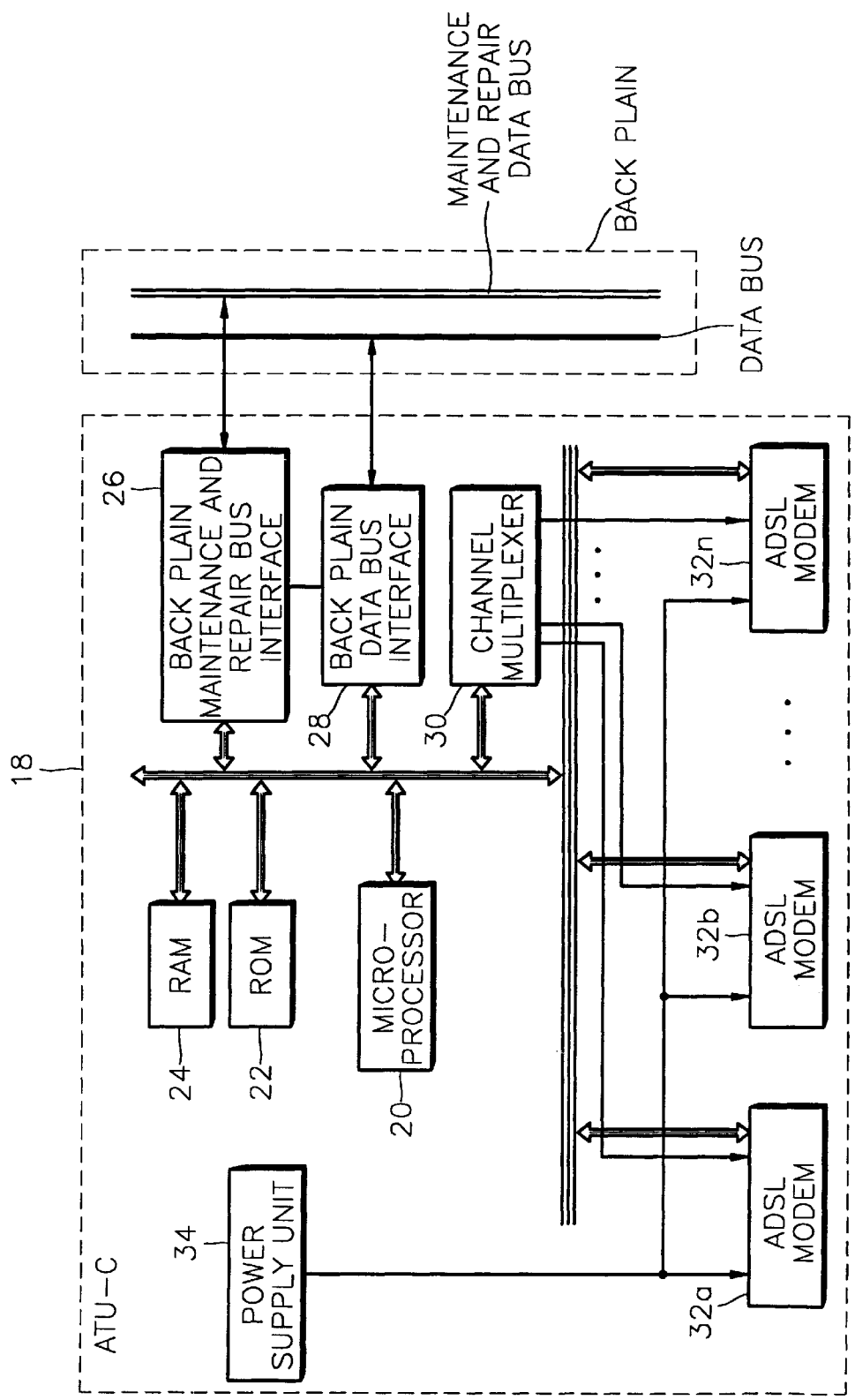
FIG. 2 is a block diagram showing the structure of a conventional asymmetric digital subscriber line transceiver unit-card (ATU-C)

In FIG. 2, which is a block diagram showing the structure of a conventional asymmetric digital subscriber line transceiver unit-card (ATU-C), a microprocessor 20 controls each element of an ATU-C 18, and exchanges administrative information with the maintenance and repair management unit 12 (see FIG. 1) to manage the maintenance and repair of the ATU-C 18. A read-only memory (ROM) 22 stores a program used to control the microprocessor 20, and a random access memory (RAM) 24 stores temporary data.

A back plain maintenance and repair data interface 26 is connected to the maintenance and repair management unit 12 (see FIG. 1). A back plain data bus interface 28, which is connected to a high-speed data network, exchanges information with neighboring ATU-Cs. A channel multiplexer 30 multiplexes data to be input to the back plain data bus interface 28 into a plurality of channels, or demultiplexes data from the bus interface 28. A plurality of modems for asymmetric digital subscriber line (ADSL) (hereinafter, ADSL modems) 32a through 32n modulate digital data into analog signals for transmission or demodulate the received analog signals into digital signals. A power supply unit 34 supplies operating power to each part of the ATU-C 18 shown in FIG. 2.

When power is supplied to the ATU-C 18 of FIG. 2, the microprocessor 22 initializes the internal status of the ATU-C 18 for operation using the program stored in the ROM 22, and checks whether a subscriber requests connection to a phone line through an ADSL device for subscriber. If there is a demand for connection, the microprocessor 20 connects the ADSL device for subscriber to an external highspeed data network through the channel multiplexer, the back plain data bus interface 22 and the data bus.

Figure 3:
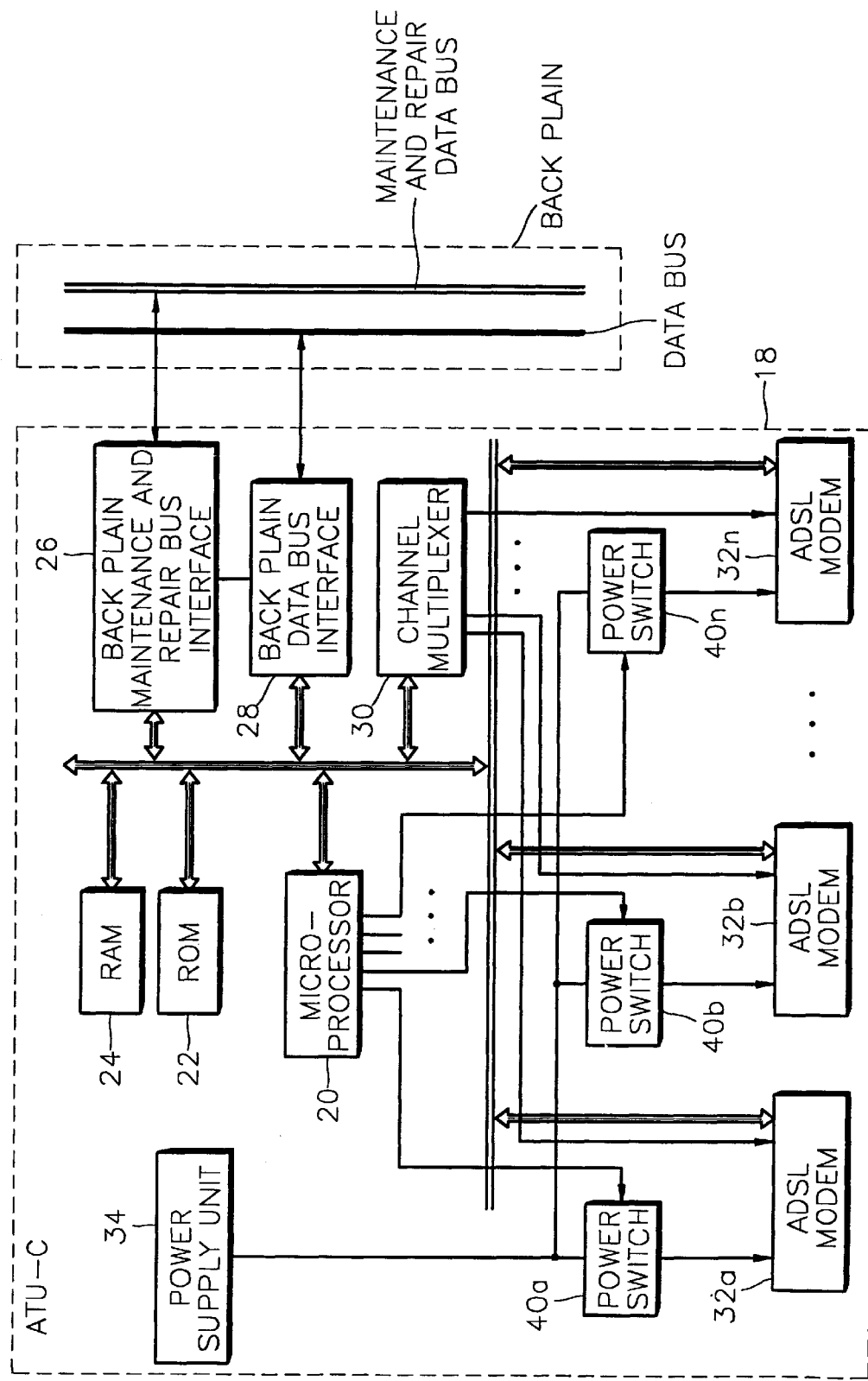
FIG. 3 is a block diagram showing the structure of an ATU-C according to the present invention.

FIG. 3 is a block diagram showing the structure of an ATU-C according to the present invention. In FIG. 3, elements same as those of FIG. 2 are represented using the same reference numerals. Explanation for these same elements are omitted. The ATU-C 18 of FIG. 3 further comprises a plurality of power switches 40a through 40n for each of the ADSL modems 32a through 32n, in contrast to the ATU-C shown in FIG. 2. The power switches 40a through 40n supply power to the ADSL modems 32a through 32n or cut off the power supply, in response to control signals from the microprocessor 20.

In the operation of the ATU-C, when power is supplied to the ATU-C 18, the microprocessor 20 initializes the ATU-C 18 for operation using the program stored in the ROM 22. During initialization, the microprocessor 20 initializes the power switches 40a through 40n to an "off" state, to avoid supplying power to the ADSL modems 32a through 32n. After the initialization, the microprocessor 20 indicates to the maintenance and repair management unit 12 (see FIG. 1) of the initialization of the corresponding ATU-C 18. Such an indication is done through the back plain maintenance and repair bus interface 26. The microprocessor then inquires of the maintenance and repair management unit 12, about which ADSL modem is to be allocated to a subscriber.

Then, the maintenance and repair management unit 12 informs the microprocessor 20 of the ATU-C 18 of which ADSL modem is to be allocated to the subscriber for service in reply to the inquiry. The microprocessor 20 of the ATU-C 18, which has received the information about the ADSL modem to be allocated, selectively drives the power switches 40a through 40n, such that power is supplied only to the corresponding ADSL modem to be allocated.

Unlike the above initialization of the ATU-C, there is a need to interrupt the power supply to an arbitrary modem for the purpose of testing. In such cases, the ATU-C according to the present invention can allow a person to cut off or resupply power to an arbitrary modem of the ATU-C through the maintenance and repair management unit for maintenance and repair.

As described above, in the ATU-C according to the present invention, power is only supplied to only a modem to be allocated to a subscriber for service, so that power consumption is reduced. Also, power supply to an arbitrary modem to be tested can be selectively interrupted without wasting power.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An asymmetric digital subscriber line transceiver unit-card (ATU-C) comprising:

a plurality of modems, that can be connected to a plurality of asymmetric digital subscriber line transceiver unit-remote (ATU-R) for subscribers;

a plurality of power switches for selectively supplying power to the plurality of modems; and a microprocessor for controlling an operation of the plurality of power switches.

2. The ATU-C of claim 1 further comprising a power supply unit, wherein power is supplied to the plurality of modems using the power supply unit.

3. The ATU-C of claim 1 wherein the microprocessor controls the operation of the plurality of power switches based on a connection status between subscribers and the plurality of modems.

4. The ATU-C of claim 1 wherein the plurality of power supply switches supply power to the plurality of modems in response to signals from the microprocessor.

5. The ATU-C of claim 1 further comprising a maintenance and repair management unit for coordinating with the microprocessor in managing maintenance and repair of the ATU-C.

6. The ATU-C of claim 1 wherein power supply can be interrupted for each of said plurality of modems for testing.

7. The ATU-C of claim 5 wherein the microprocessor obtains information on the connection status of the plurality of modems and the subscribers by querying the maintenance and repair management unit.

8. The ATU-C of claim 5 wherein a user is provided the ability to cut off and resupply power to each of said plurality of modems through the maintenance and repair management unit for testing.

9. A method of controlling an asymmetric digital subscriber line transceiver unit-card (ATU-C) including a power supply unit; a plurality of modems that can be connected to a plurality of asymmetric digital subscriber line transceiver unit-remote (ATU-R) for subscribers; a plurality of power switches for selectively supplying power generated by the power supply unit to the modems; and a microprocessor for controlling the operation of the power switches depending on the connection status between the subscribers and the modems, the method comprising:

initializing the ATU-C after power is supplied to the ATU-C, by initializing the power switches to an off state in which power is not applied to the plurality of modems; and controlling the power switches depending on the connection status between the subscribers and the modems, to supply power only to a subset of the plurality of modems that are allocated to subscribers.

* * * * *